(12) United States Patent
Matsumoto

(10) Patent No.: US 9,469,479 B2
(45) Date of Patent: Oct. 18, 2016

(54) TRANSPORT UNIT, DECELERATION STOP DEVICE, TRANSPORT SYSTEM, AND CONTROL METHOD

(71) Applicant: HIRATA CORPORATION, Shinagawa-ku, Tokyo (JP)

(72) Inventor: Bungo Matsumoto, Tokyo (JP)

(73) Assignee: HIRATA CORPORATION, Shinagawa-Ku, Tokyo (JP)

( * ) Notice: Subject to any disclaimer, the term of this patent is extended or adjusted under 35 U.S.C. 154(b) by 0 days.

(21) Appl. No.: 14/672,918

(22) Filed: Mar. 30, 2015

(65) Prior Publication Data

US 2015/0203298 A1 Jul. 23, 2015

Related U.S. Application Data

(63) Continuation of application No. PCT/JP2012/006386, filed on Oct. 4, 2012.

(51) Int. Cl.
*B65G 47/26* (2006.01)
*B65G 43/08* (2006.01)
*B65G 13/02* (2006.01)
*B65G 13/071* (2006.01)
*B65G 13/073* (2006.01)
*B65G 37/00* (2006.01)

(52) U.S. Cl.
CPC ............ *B65G 13/02* (2013.01); *B65G 13/071* (2013.01); *B65G 13/073* (2013.01); *B65G 37/00* (2013.01); *B65G 43/08* (2013.01); *B65G 47/261* (2013.01)

(58) Field of Classification Search
CPC B65G 13/071; B65G 47/261; B65G 13/073; B65G 43/08
See application file for complete search history.

(56) References Cited

U.S. PATENT DOCUMENTS

| 4,266,660 A * | 5/1981 | Herman ............... | B65G 47/261 198/781.02 |
| 4,325,474 A * | 4/1982 | Rae ...................... | B65G 47/261 198/781.02 |
| 4,798,282 A * | 1/1989 | Sperduti .............. | B65G 47/261 193/35 A |

(Continued)

FOREIGN PATENT DOCUMENTS

| CN | 202321449 U | 7/2012 |
| DE | 4007707 A1 | 9/1990 |

(Continued)

OTHER PUBLICATIONS

Chinese Office Action dated Dec. 2, 2015 issued in corresponding Chinese Patent Appln. No. 201280076213.1 (7 pages).

(Continued)

*Primary Examiner* — Gene Crawford
*Assistant Examiner* — Thomas Randazzo
(74) *Attorney, Agent, or Firm* — Buchanan Ingersoll & Rooney PC

(57) ABSTRACT

This invention provides a transport unit that includes driving rollers arrayed in the transport direction of a work, and when the work transported by the driving rollers reaches a predetermined stop position, stops movement of the work. The driving rollers include at least one first driving roller, and at least one second driving roller arranged on the side of the predetermined stop position in the transport direction with respect to the first driving roller. The first driving roller is a roller capable of idling on a driving shaft. The second driving roller is a roller incapable of idling on the driving shaft.

4 Claims, 12 Drawing Sheets

(56) References Cited

U.S. PATENT DOCUMENTS

| | | | | |
|---|---|---|---|---|
| 5,174,434 | A * | 12/1992 | Bourgoine | B05B 13/0221 198/803.2 |
| 5,318,167 | A * | 6/1994 | Bronson | B65G 47/261 198/343.1 |
| 5,558,205 | A * | 9/1996 | Helgerson | B65G 47/261 198/781.04 |
| 5,558,206 | A * | 9/1996 | Helgerson | B65G 13/073 193/37 |
| 6,193,047 | B1 * | 2/2001 | Brumm | B23Q 7/055 198/345.1 |
| 6,459,224 | B2 * | 10/2002 | Itoh | B65G 13/075 198/571 |
| 7,503,450 | B2 * | 3/2009 | Helgerson | B65G 13/07 193/37 |
| 7,542,823 | B2 * | 6/2009 | Nagai | B65G 43/10 198/460.1 |
| 7,748,520 | B1 * | 7/2010 | Helgerson | B65G 13/071 198/781.03 |
| 2006/0260911 | A1 * | 11/2006 | Eckert | B65G 47/31 198/784 |
| 2013/0299319 | A1 * | 11/2013 | Scates | B65G 13/07 198/790 |

FOREIGN PATENT DOCUMENTS

| | | |
|---|---|---|
| JP | 47-010102 | 3/1972 |
| JP | 09-188414 A | 7/1997 |
| JP | 09-290918 A | 11/1997 |
| JP | 11-165834 A | 6/1999 |
| JP | 11-199030 A | 7/1999 |
| JP | 2000-085955 A | 3/2000 |
| JP | 2003-086654 A | 3/2000 |
| JP | 2002-176091 A | 6/2002 |
| JP | 2004-075311 A | 3/2004 |
| JP | 2005-119798 A | 5/2005 |
| JP | 5439137 B2 | 3/2014 |

OTHER PUBLICATIONS

International Search Report (PCT/ISA/210) mailed on Dec. 11, 2012, by the Japanese Patent Office as the International Searching Authority for International Application No. PCT/JP2012/006386.
Written Opinion (PCT/ISA/237) mailed on Dec. 11, 2012, by the Japanese Patent Office as the International Searching Authority for International Application No. PCT/JP2012/006386.

* cited by examiner

F I G. 12
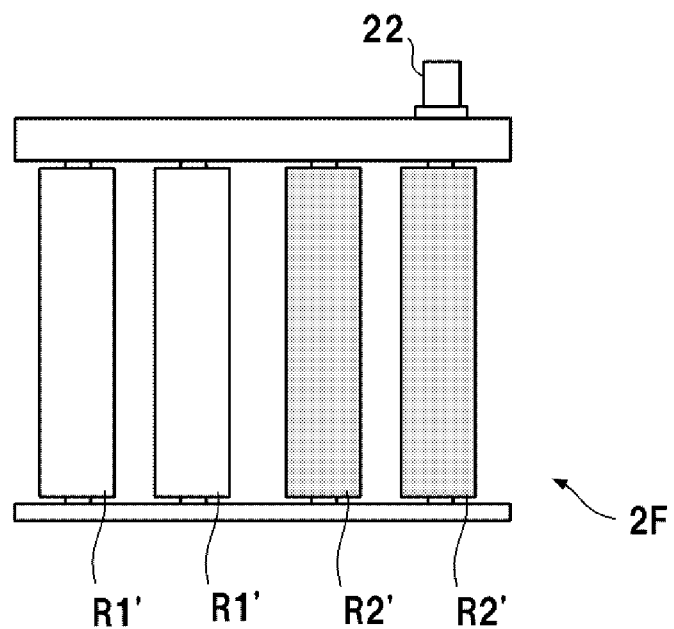

TRANSPORT UNIT, DECELERATION STOP DEVICE, TRANSPORT SYSTEM, AND CONTROL METHOD

This application is a continuation of International Patent Application No. PCT/JP2012/006386 filed on Oct. 4, 2012, the entire content of which is incorporated herein by reference.

BACKGROUND OF THE INVENTION

1. Field of the Invention

The present invention relates to a work transport technique by a driving roller.

2. Description of the Related Art

A roller conveyor is known as a work transport apparatus. As a method of increasing or decreasing the work transport speed, there is proposed an arrangement in which a plurality of roller conveyor units having different transport speeds are sequentially arranged. In this arrangement, when a work passes through the roller conveyor units, it is sometimes damaged by the friction between the work and the roller owing to the transport speed difference. Japanese Patent Publication No. 47-10102 discloses an apparatus that reduces the friction between a work and a roller by cutting power transfer of some driving rollers and enabling free rotation when the work passes through the roller conveyor units. Japanese Patent Laid-Open No. 9-188414 and Japanese Patent Laid-Open No. 2000-85955 disclose apparatuses that reduce the friction between a work and a roller by variably controlling the rotational speed of a roller.

Variable control of the rotational speed of a roller requires a control apparatus for speed control, which raises the cost. Therefore, driving control of the roller is preferably ON/OFF control of constant-speed driving or stop. However, this arrangement has the above-mentioned problem of the friction between the work and the roller.

To solve this, a roller that idles upon application of a predetermined load may be used as a driving roller. When the transport speed difference is large, the roller in contact with a work idles to reduce the friction. However, when stopping a work, the deceleration distance tends to be long, and the transport apparatus becomes large. In some cases, a work does not stop at a predetermined position and overruns. To prevent the overrun, some member may abut against a work at the stop position to physically stop the work. However, the roller idles, and the work may be moved back owing to a shock at the time of abutment.

SUMMARY OF THE INVENTION

It is an object of the present invention to stop a work more reliably in a shorter distance by a relatively simple arrangement.

According to an aspect of the present invention, there is provided a transport unit which comprises a plurality of driving rollers arrayed in a transport direction of a work and stops movement of the work when the work transported by the plurality of driving rollers reaches a predetermined stop position, wherein the plurality of driving rollers include at least one first driving roller, and at least one second driving roller arranged on a side of the predetermined stop position in the transport direction with respect to the first driving roller, the first driving roller is capable of idling on a driving shaft, and the second driving roller is incapable of idling on a driving shaft.

According to another aspect of the present invention, there is provided a deceleration stop device comprising the above plurality of transport units, wherein the plurality of transport units are arrayed parallel to each other, and the deceleration stop device further comprises a stop device configured to abut against a work at the predetermined stop position and stop movement of the work.

According to still another aspect of the present invention, there is provided a transport system comprising at least one first transport unit, and a second transport unit arranged downstream in a transport direction of a work successively to the first transport units, wherein the first transport unit is an accumulation conveyor including a plurality of driving rollers, the second transport unit includes at least one first driving roller, and at least one second driving roller arranged downstream in the transport direction with respect to the first driving roller, the first driving roller is capable of idling on a driving shaft, and the second driving roller is incapable of idling on a driving shaft.

According to the present invention, there is provided a method of controlling the transport system.

BRIEF DESCRIPTION OF THE DRAWINGS

FIG. 12 is an explanatory view of another example of the transport unit.

DESCRIPTION OF THE EMBODIMENTS

Figure 1:
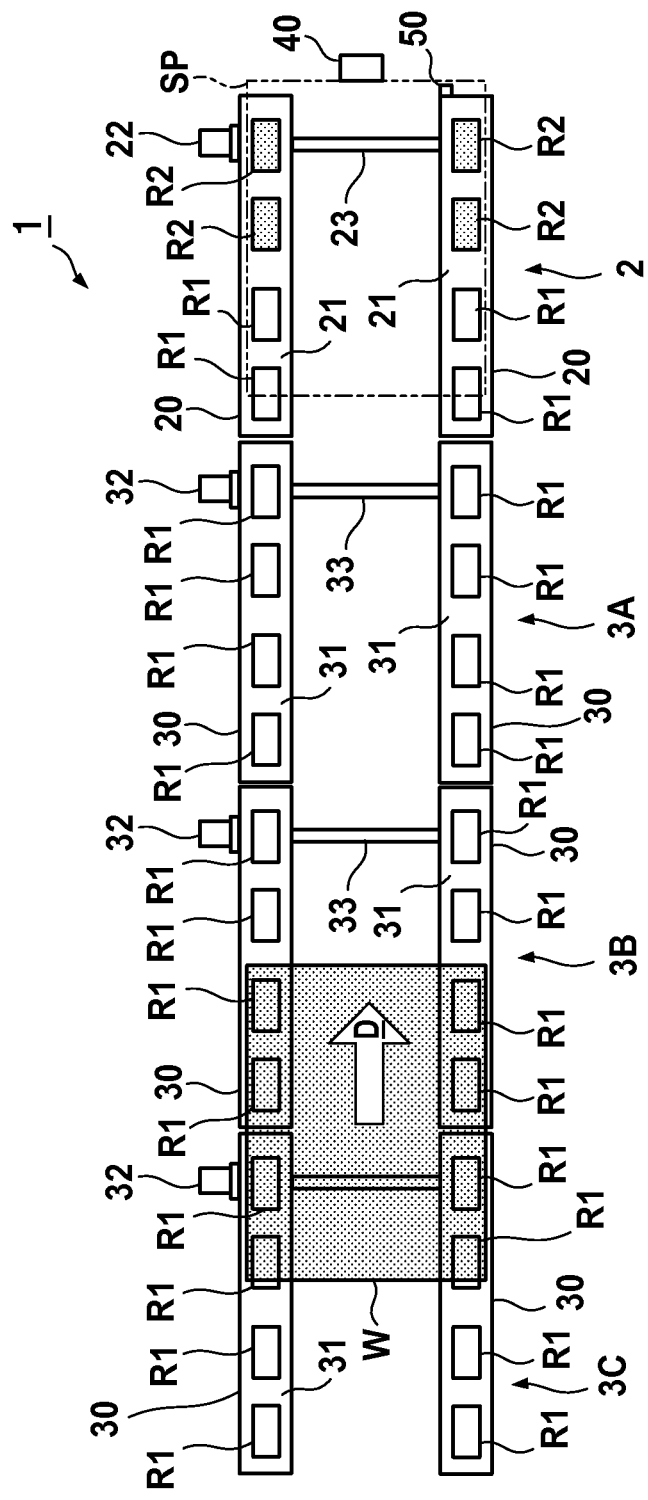
FIG. 1 is a plan view of a transport system according to one embodiment of the present invention.

<First Embodiment>
<Transport System>
FIG. 1 is a plan view of a transport system 1 according to one embodiment of the present invention. In particular, FIG. 1 shows a portion (deceleration stop device) that stops a work W at a stop position SP while transporting it in a transport direction indicated by an arrow D and decelerating it. The work W is, for example, a part such as a substrate, or a part and a pallet on which the part is mounted.

The transport system 1 includes one transport unit 2, and a plurality of transport units 3A to 3C (to be generically referred to as transport units 3 hereinafter). The transport units 2 and 3 are successively arranged to be parallel to each other in the transport direction D (particularly linearly in this embodiment). In the example of FIG. 1, the transport unit 2 is located at a downstream end on the downstream side with respect to the transport units 3 in the transport direction D. The transport unit 3C is located on the uppermost stream side in the transport direction D, among the transport units 2 and 3. Although the three transport units 3 are arranged in this embodiment, one transport unit, two transport units, or four or more transport units may be arranged.

The transport system 1 includes a stop device 40 that abuts against the work W at the stop position SP and stops the movement of the work W. In this embodiment, the stop device 40 always exists on the transport track of the work W. The stop device 40 can be a well-known device, and may have a buffer mechanism that buffers the shock of abutment at the time of abutment against the work W.

The transport system 1 also includes a stop position sensor 50 which detects that the work W has reached the stop position SP. The sensor 50 is arranged to detect the leading edge of the work W when the work W reaches the stop position. The sensor 50 is, for example, a reflective photosensor. In this embodiment, the sensor 50 is arranged in the transport unit 2 below the transport track of the work W.

<Transport Unit>

The transport unit 2 includes a pair of roller conveyors 20, a driving unit 22 (motor here), and a transfer shaft 23. The roller conveyors 20 are arranged to be spaced apart from each other in a direction perpendicular to the transport direction D.

Each roller conveyor 20 includes a plurality of driving rollers R1 and R2 (to be generically referred to as driving rollers R hereinafter) arrayed in the transport direction D. In this embodiment, each roller conveyor 20 includes a total of four driving rollers R. In FIG. 1 and some drawings to be described later, the driving rollers R2 are colored to make it easy to visually discriminate the driving rollers R1 and the driving rollers R2. Each roller conveyor 20 includes a hollow frame 21 that rotatably supports each driving roller R.

The driving unit 22 is supported by the frame 21 of one roller conveyor 20. The transfer shaft 23 transfers the driving force of the driving unit 22 to the other roller conveyor 20. One roller conveyor 20 and the other roller conveyor 20 are driven synchronously.

In this embodiment, the transport unit 3 has the same arrangement as that of the transport unit 2 except that the driving rollers R are formed from only the driving rollers R1. That is, the transport unit 3 includes a pair of roller conveyors 30, a driving unit 32 (motor here), and a transfer shaft 33. The roller conveyors 30 are arranged to be spaced apart from each other in a direction perpendicular to the transport direction D.

Each roller conveyor 30 includes a plurality of driving rollers R1 arrayed in the transport direction D. Unlike the roller conveyor 20, the roller conveyor 30 does not include the driving roller R2. In this embodiment, each roller conveyor 30 includes four driving rollers R1. Each roller conveyor 30 includes a hollow frame 31 that rotatably supports each driving roller R1.

The driving unit 32 is supported by the frame 31 of one roller conveyor 30. The transfer shaft 33 transfers the driving force of the driving unit 32 to the other roller conveyor 30. One roller conveyor 30 and the other roller conveyor 30 are driven synchronously.

In this embodiment, the respective rollers of the roller conveyors 20 and 30 are formed from only the driving rollers R that rotate upon receiving a driving force. However, these rollers may include an idle roller.

<Driving Roller>

Figure 2:
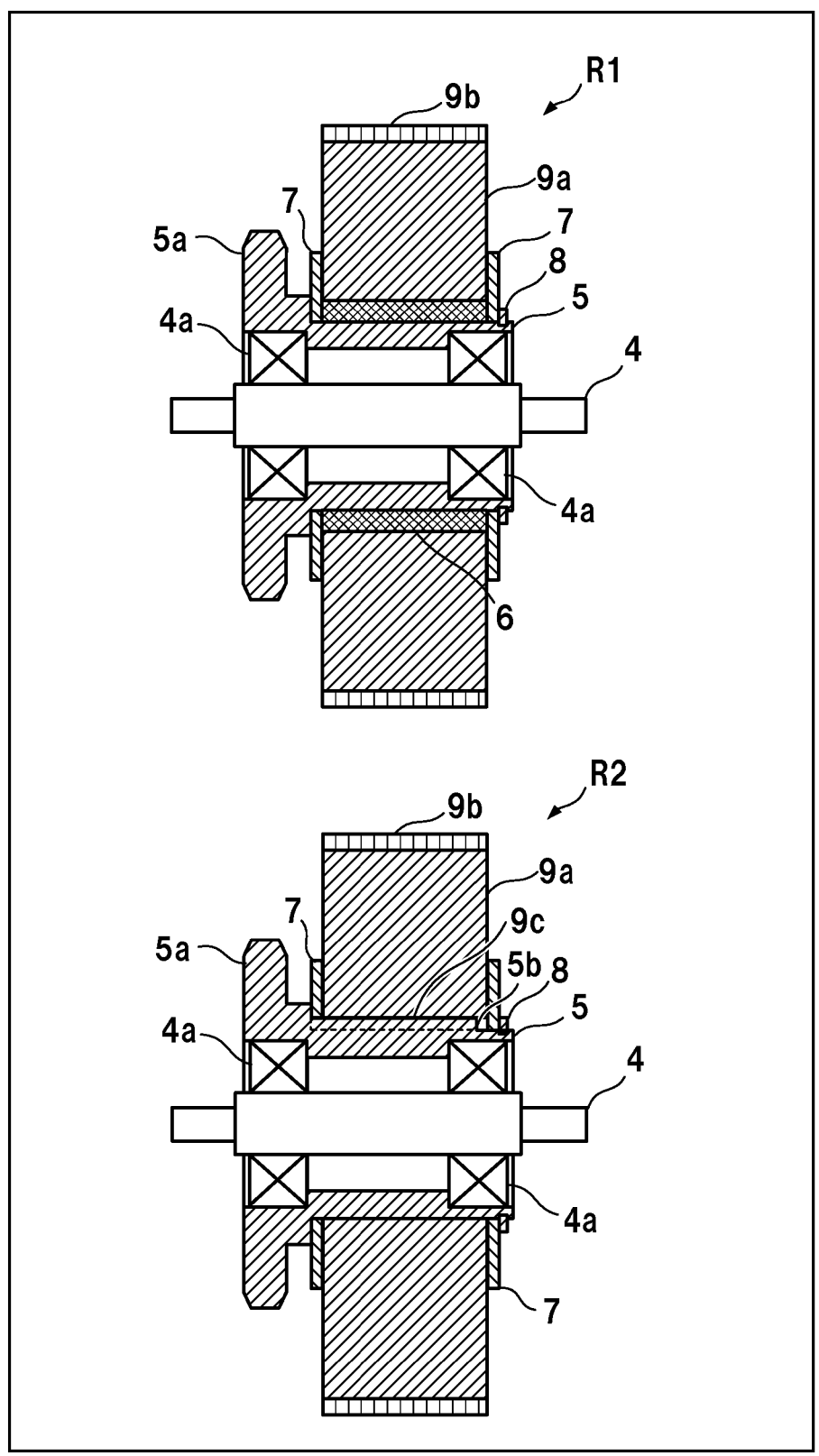
FIG. 2 is a sectional view of driving rollers of two types.

The difference between the driving rollers R1 and R2 will be explained. The driving roller R1 is a roller capable of idling on the driving shaft, and the driving roller R2 is a roller incapable of idling on the driving shaft. As described above, the transport unit 3 is constituted by only the driving rollers R1, and constitutes a so-called accumulation conveyor. FIG. 2 is a sectional view showing an example of the arrangements of the driving rollers R1 and R2. This embodiment assumes that a chain transmission mechanism is employed as a driving force transfer method. However, another transmission mechanism such as a gear mechanism or a belt transmission mechanism can also be adopted. First, an example of the arrangement of the driving roller R1 will be explained.

In this embodiment, the driving roller R1 includes a cylindrical roller main body 9a, and a cover portion 9b that covers the outer surface of the roller main body 9a. The roller main body 9a is made of, for example, a metal, and the cover portion 9b is made of, for example, rubber. The cover portion 9b is arranged to increase the frictional force with the work W, but an arrangement in which the cover portion 9b is not arranged can also be employed. Especially, it is also possible not to arrange the cover portion 9b on the driving roller R1 in order to reduce the friction with the work W, and arrange the cover portion 9b on the driving roller R2 in order to increase the frictional force with the work W.

A driving shaft 5 is inserted into the roller main body 9a via a friction member 6. The driving shaft 5 is a cylindrical member, and a sprocket 5a is integrally formed at one end of the driving shaft 5. A chain (not shown) is wound around the sprocket 5a. The chain travels by the driving force of the driving unit 22 or 32 to rotate the driving shaft 5.

Spacers 7 are annular members arranged on the respective end faces of the roller main body 9a. A snap ring 8 is engaged with one end portion of the driving shaft 5 to prevent slippage of the roller main body 9a. Bearings 4a are disposed inside the driving shaft 5. The bearing 4a is, for example, a ball bearing. A support shaft 4 is inserted through the bearings 4a, and the two end portions of the support shaft 4 are supported by the frame 21 or 31. In this manner, the driving shaft 5 is rotatably arranged around the support shaft 4.

The friction member 6 is a cylindrical member, and is interposed between the driving shaft 5 and the roller main body 9a to frictionally transfer the rotational force of the driving shaft 5 to the roller main body 9a. When the rotational load of the driving roller R1 exceeds the frictional force between the roller main body 9a and the friction member 6, the roller main body 9a slides and idles. In this fashion, the driving roller R1 is not fixed to the driving shaft 5 in the rotational direction, and idles when a predetermined or more load acts.

Next, an example of the arrangement of the driving roller R2 will be explained. The peripheral structure of the driving roller R2 is basically the same as that of the driving roller R1 except that the driving roller R2 is fixed to the driving shaft 5 in the rotational direction. That is, the driving roller R2 does not idle on the driving shaft 5.

More specifically, the friction member 6 in the driving roller R1 is not arranged, and a key portion 5b is formed on the driving shaft 5. A key groove 9c to which the key portion 5b is inserted is formed in the roller main body 9a. The engagement between the key portion 5b and the key groove 9c prevents idling of the driving roller R2 on the driving shaft 5.

Rotational driving of the driving rollers R in the transport units 2 and 3 will be explained simply. A common endless chain (not shown) is wound around the sprockets 5a for each of the roller conveyors 20 and 30 of the transport units 2 and 3. The endless chain travels by driving of the driving unit 22 or driving unit 23 to rotate the driving rollers R.

For example, as for the transport unit 2, the endless chain is wound around the sprockets 5a (a total of four sprockets 5a) of the two driving rollers R1 and two driving rollers R2 for each roller conveyor 20. The driving unit 22 drives the endless chain to travel and rotate the driving rollers R1 and R2. The transfer shaft 23 transfers the driving force between the two roller conveyors 20. Accordingly, a total of eight driving rollers R of the transport unit 2 can be synchronized and driven at a uniform speed.

This embodiment assumes that the transport speed (rotational speed) of the driving roller R differs between the transport units 2 and 3. As a method for this, for example, outputs from the driving units 22 and 32 may be changed between the transport units 2 and 3. More specifically, supply voltages to the driving units 22 and 32 are set to be different between the transport units 2 and 3. As another method, for example, the number of teeth of the sprocket 5a is set to be different between the transport units 2 and 3.

<Control Apparatus>

Figure 3:
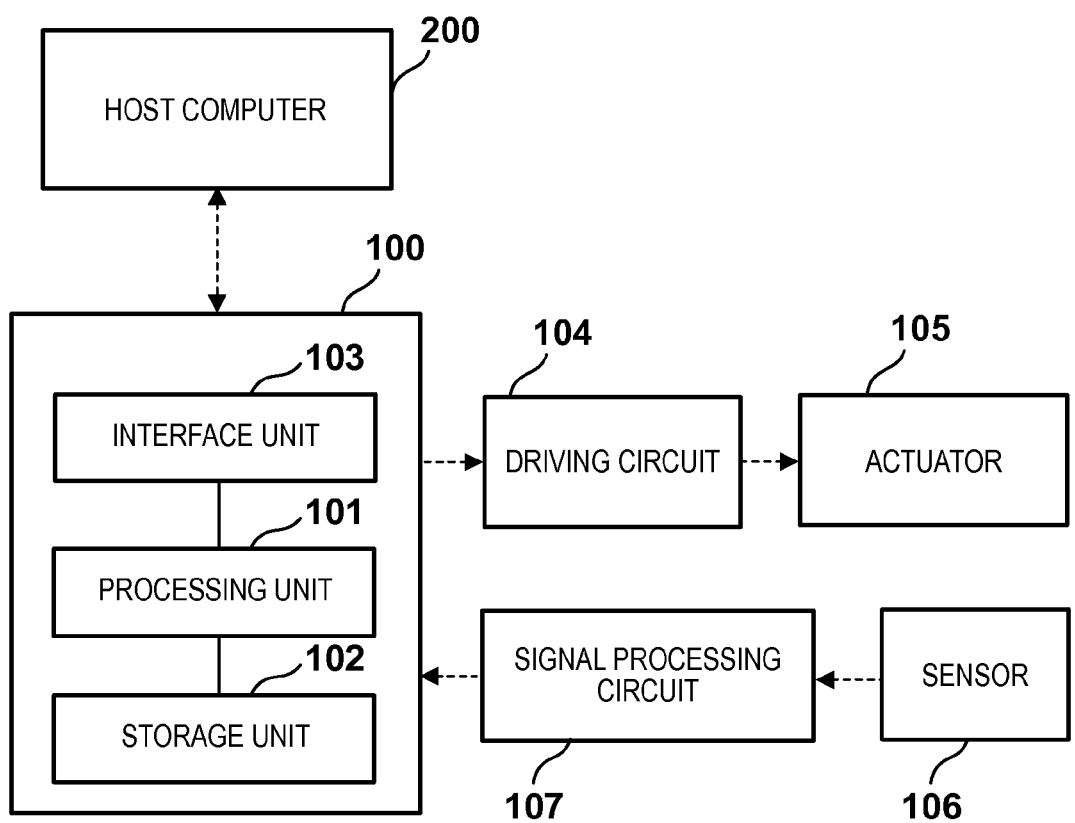
FIG. 3 is a block diagram of a control apparatus.

The control apparatus of the transport system 1 will be described next. FIG. 3 is a block diagram of a control apparatus 100. The control apparatus 100 controls the overall transport system 1 in accordance with an instruction from a host computer 200.

The control apparatus 100 includes a processing unit 101, a storage unit 102, and an interface unit 103. The processing unit 101, the storage unit 102, and the interface unit 103 are connected to each other by a bus (not shown). The processing unit 101 executes a program stored in the storage unit 102. The processing unit 101 is, for example, a CPU. The storage unit 102 is, for example, a RAM, a ROM, or a hard disk. The interface unit 103 includes a communication interface that manages communication between the processing unit 101 and the host computer 200, and an I/O interface that manages input/output of data between the processing unit 101 and an external device.

The processing unit 101 outputs a control command for an actuator 105 to a driving circuit 104, and drives the actuator 105. The actuator 105 includes the driving units 22 and 32. The processing unit 101 acquires the detection result of a sensor 106 via a signal processing circuit 107, and performs predetermined processing such as control of the actuator 105. The sensor 106 includes the sensor 50.

<Control Example>

Figure 4:
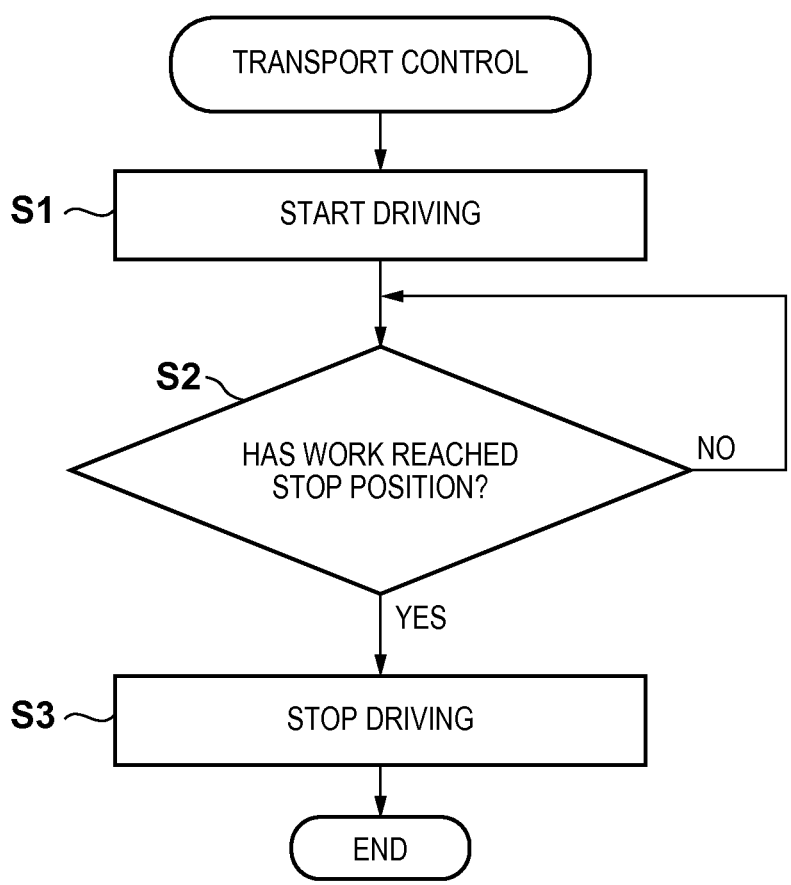
FIG. 4 is a flowchart of an example of transport control.
Figure 5:
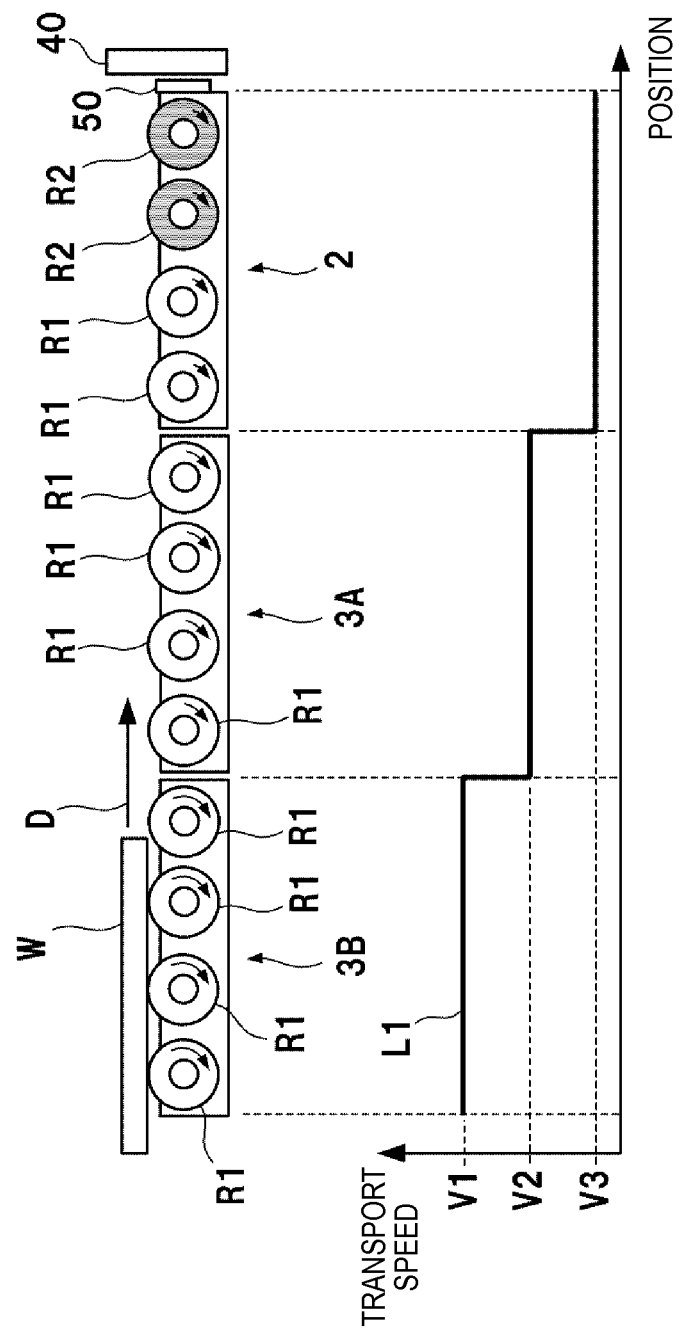
FIG. 5 is an explanatory view of the example of transport control.
Figure 6:
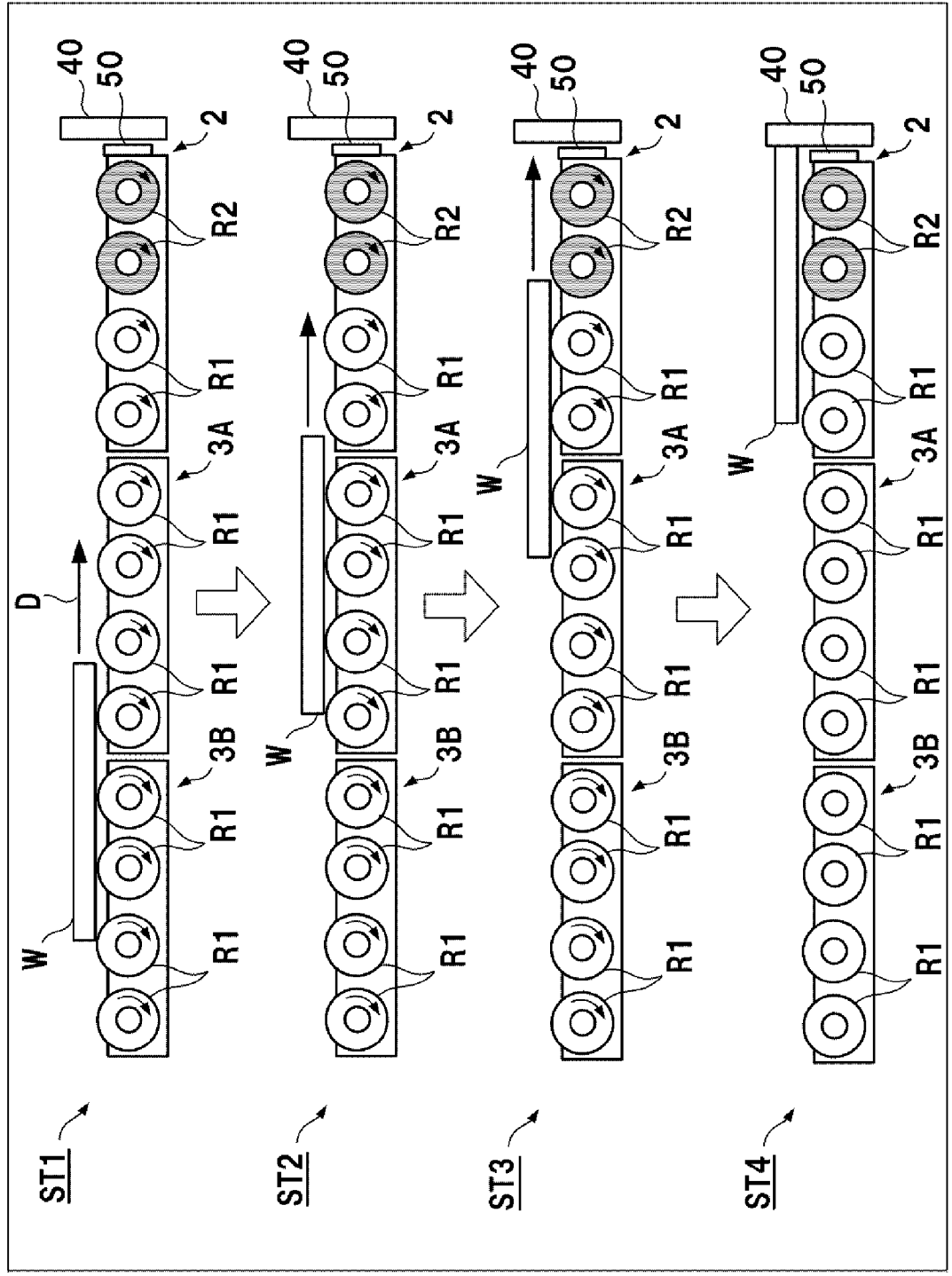
FIG. 6 is an explanatory view of the example of transport control.

An example of transport control of the work W by the processing unit 101 will be explained next with reference to FIGS. 4 to 6. FIG. 4 is a flowchart of an example of transport control to be executed by the processing unit 101. FIGS. 5 and 6 are explanatory views of the example of transport control, in which the transport unit 3C is not illustrated. Control of stopping the work W at the stop position SP while decelerating it will be explained.

Referring to FIG. 4, when the work W is loaded by a robot or the like, driving of the driving units 22 and 32 starts in step S1. For example, power supply to the driving units 22 and 32 starts. By driving of the driving units 22 and 32, the driving rollers R rotate. Assume that the rotational speed of the driving roller R is always uniform in each of the transport units 2 and 3 at the time of driving. A solid line L1 in FIG. 5 indicates the transport speed (rotational speed of the driving roller R (driving shaft 5)) of each of the transport units 2 and 3. In the example of FIG. 5, all the driving rollers R1 are rotated at a speed V1 in the transport unit 3B. In the transport unit 3A, all the driving rollers R1 are rotated at a speed V2 lower than the speed V1 (V1>V2). In the transport unit 2, all the driving rollers R1 and R2 are rotated at a speed V3 lower than the speed V2 (V2>V3).

By rotating the driving rollers R, the work W located upstream is transported downstream. At this time, the work W passes through the transport units while decelerating through the transport unit 3C→transport unit 3B→transport unit 3A→transport unit 2. At this time, a state (single transport state) in which the work W is transported by a single transport unit, and a state (joint transport state) in which the work W is transported jointly by two transport units can be generated.

State ST1 in FIG. 6 exemplifies a joint transport state in which the work W moves from the transport unit 3B to the transport unit 3A. The transport units 3A and 3B are different in the rotational speed of the driving roller R1. However, all the driving rollers R1 of both the transport units 3A and 3B can idle. Thus, even if the rotational speeds of the driving rollers R1 of both the transport units 3A and 3B are different, the speed difference is absorbed by idling of the driving rollers R1.

More specifically, in the joint transport state, when viewed from the transport unit 3B having a high transport speed, the transport unit 3A having a low transport speed serves as a resistance. At this time, the driving rollers R1 of the transport unit 3B idle to prevent abutment between the work W and the driving rollers R1 over a predetermined frictional force. To the contrary, in the joint transport state, when viewed from the transport unit 3A having a low transport speed, the work W is fed at an overspeed (speed higher than the rotational speed V2) from the transport unit 3B having a high transport speed. At this time, the driving rollers R1 idle in the transport unit 3A to permit the passage of the work W transported at the overspeed.

Referring back to FIG. 6, state ST2 exemplifies a single transport state in which the work W is transported by only the transport unit 3A. State ST3 exemplifies a joint transport state in which the work W moves from the transport unit 3A to the transport unit 2. The transport units 2 and 3A are different in the rotational speed of the driving roller R (the rotational speed V2 of the driving roller R1 in the transport unit 3A >the rotational speed V3 of the driving rollers R1 and R2 in the transport unit 2).

In state ST2, when the mass of the work W is large or the rotational speed V1 of the driving roller R1 in the transport unit 3B is high, the moment of inertia of the work W is large. Even if the work W is completely transferred to the transport unit 3A, the deceleration of the actual transport speed of the work W is very small. That is, the actual transport speed of the work W is higher than the rotational speed V2. The transport state of the work W at this speed higher than the rotational speed V2 hardly changes even if the transportation of the work W reaches the driving roller R1 in the transport unit 2.

However, if the transportation of the work W reaches the driving roller R2 in the transport unit 2 and changes to state ST3, the work W is decelerated abruptly. This is because the driving roller R2 in the transport unit 2 is a direct drive roller that does not idle, and the rotational speed V3 of the driving roller R2 and the transport speed of the work W become equal. That is, the driving roller R2 cannot permit the deviation between the rotational speed V3 and the transport speed of the work W, so the work W is decelerated abruptly. In practice, a slip is generated between the driving roller R2 and the work W during this deceleration.

The slip amount of the driving roller R1 in the transport unit 3A further increases, and the slip amount of the driving roller R1 in the transport unit 2 decreases. As a result, the deviation between the transport speed of the work W and the rotational speed V3 of the driving rollers R1 and R2 in the transport unit 2 is almost eliminated. This deceleration effect (deviation reduction effect) becomes large when the work W is transferred to the next driving roller R2. A case in which the slip amount of the driving roller R1 in the transport unit 3A further increases has been exemplified. In some cases, however, this slip amount does not change (or hardly changes) depending on the speed difference of the driving roller R1 between the transport unit 3A and the transport unit 2.

When the work W changes to the single transport state in which the work W is transported by only the transport unit 2, the transport speed of the work W becomes equal to the rotational speed V3. After that, the work W is transported toward the stop position SP at the rotational speed V3.

Referring back to FIG. 4, in step S2, the detection result of the sensor 50 is acquired to determine whether the work W has reached the stop position SP. If the work W has reached the stop position SP, the process advances to step S3. If the work W has not reached the stop position SP, the processing in step S2 is repeated.

In step S3, the driving units 22 and 32 are stopped. For example, power supply to the driving units 22 and 32 is stopped. In response to this, the rotation of the driving rollers R is also stopped. State ST4 in FIG. 6 represents a state in which the work W has reached the stop position SP and abutted against the stop device 40, and its movement has been stopped.

In the transport unit 2, the driving rollers R on the downstream side are the driving rollers R2 incapable of idling. If there is no slip between the driving roller R2 and the work W, the work W also stops upon the stop of rotation of the driving roller R2. Compared to the driving roller R1 capable of idling, the driving roller R2 can prevent the overrun of the work W. Since the driving roller R2 is the driving roller R on which the work W is mounted at the stop position SP, the work W can be stopped more reliably in a shorter distance.

If the rotation of the driving roller R2 can be instantaneously stopped by stopping the driving of the driving unit 22, the stop device 40 is unnecessary. However, in an arrangement in which a brake device or the like is not arranged in the driving unit 22, the rotor of the driving unit 22 inertially rotates even after the stop of power supply, and may slightly rotate the driving roller R2. In this embodiment, therefore, the stop device 40 is arranged to more reliably stop the work W.

While the rotor of the driving unit 22 inertially rotates, the work W is pressed and abuts against the stop device 40 by this rotation until the driving of the driving roller R2 is completely stopped. After the driving of the driving roller R2 is completely stopped, the work W is also completely stopped at the position of abutment against the stop device 40, that is, is stopped at the stop position SP. This improves the positioning accuracy of the work W at the stop position SP. The work W stopped at the stop position SP is unloaded by, for example, a robot (not shown).

When the stop device 40 is arranged to cause the work W to abut against it, the work W may be moved back in reaction to the shock. However, the driving roller R2 cannot idle, so this backward movement is also prevented. As a comparative example of this, a case in which all the driving rollers R of the transport unit 2 are formed from the driving rollers R1 will be explained with reference to FIG. 7.

Figure 7:
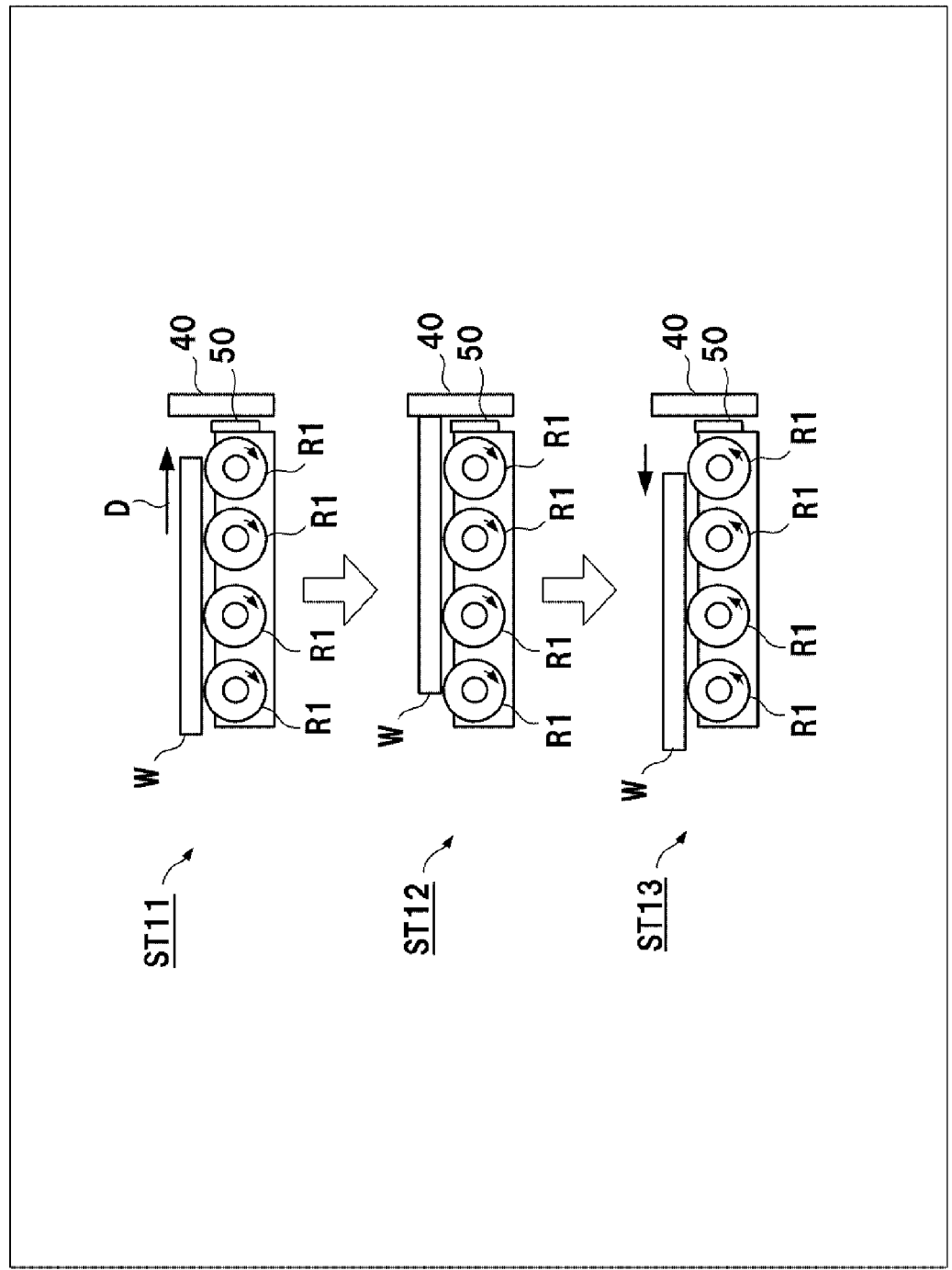
FIG. 7 is an explanatory view of a comparative example.

State ST11 in FIG. 7 represents a state immediately before the work W reaches the stop position SP. State ST12 represents a state in which the sensor 50 has detected that the work W has reached the stop position SP, and all the driving rollers R1 have been stopped. The work W abuts against the stop device 40, and a backward movement may be generated in reaction to a shock at that time, as represented by state ST13. Since the driving rollers R1 idle at this time, they may rotate reversely following the backward movement of the work W. This situation can be avoided by using the driving roller R2 incapable of idling, as in this embodiment. As a result, the transport system 1 according to this embodiment does not require an anti-back apparatus (system) for preventing the backward movement of the work W in reaction to a shock, and the apparatus arrangement becomes simple at low cost.

As described above, according to this embodiment, the work W can be stopped more reliably in a shorter distance by using both the driving rollers R1 and R2, while preventing damage to the work W. In addition, this effect can be implemented only by using both the driving rollers R1 and R2, and control of the driving units 22 and 32 is substantially ON/OFF control. Hence, the above-described effect can be implemented by a relatively simple arrangement.

<Second Embodiment>

Figure 8:
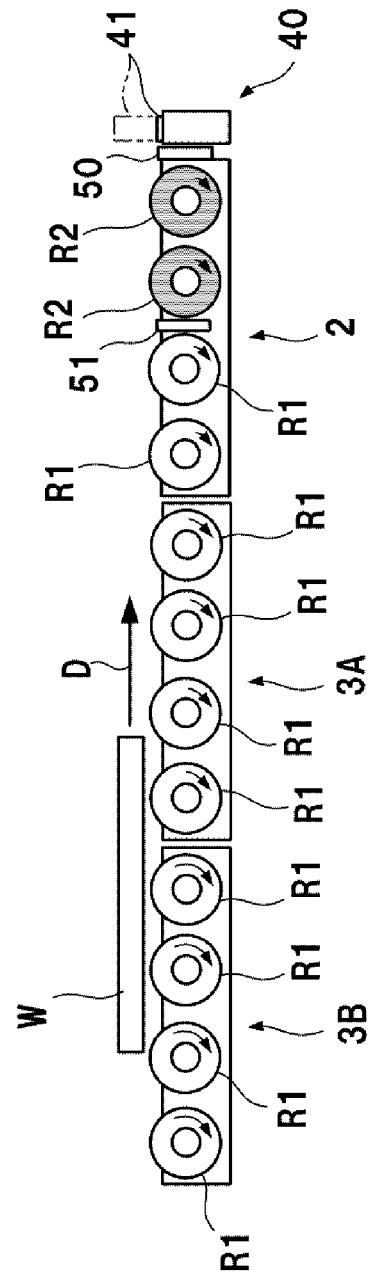
FIG. 8 is an explanatory view of another embodiment.

The first embodiment assumes that the stop device 40 always exists on the transport track of the work W, but a movable stop device capable of advancing to and retracting from the transport track may be used. FIG. 8 is a schematic view showing an example of this stop device. A stop device 40 according to this embodiment includes a movable portion 41, and an actuator (not shown) that vertically moves the movable portion 41. The movable portion 41 moves between an up position, indicated by a chain double-dashed line, on the transport track, and a down position, indicated by a solid line, below the transport track. By locating the movable portion 41 at the down position, a transport form in which a work W is transported further downstream of a transport unit 2 can be selected.

In this embodiment, a sensor 51 is arranged. The sensor 51 is a preparation position sensor which detects that the work W has reached a stop preparation position on the upstream side in a transport direction D with respect to a stop position SP. As the sensor 51, a sensor of this same type as the sensor 50 can be employed though the arrangement position is different.

Figure 9:
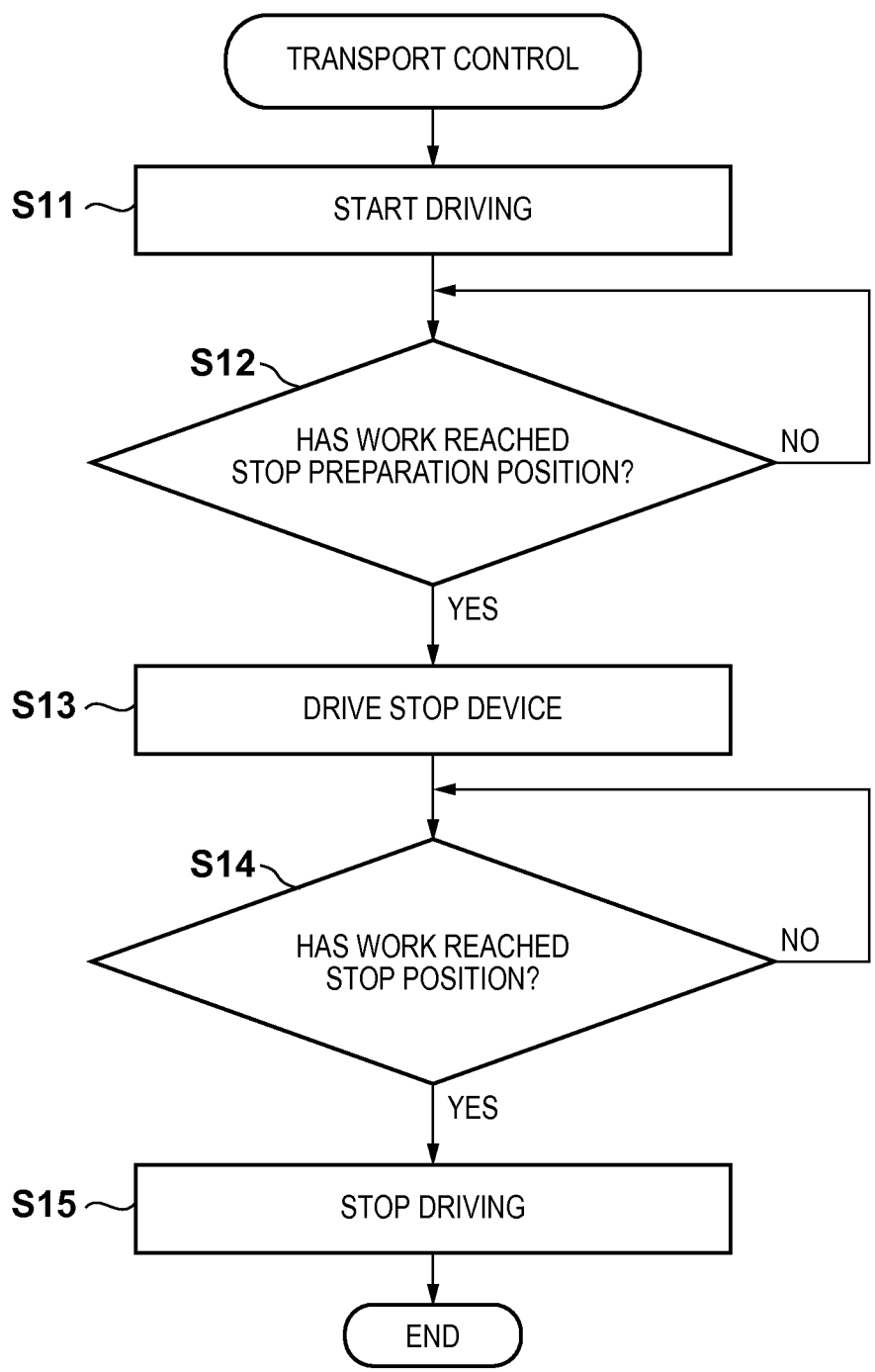
FIG. 9 is a flowchart of an example of transport control.
Figure 10:
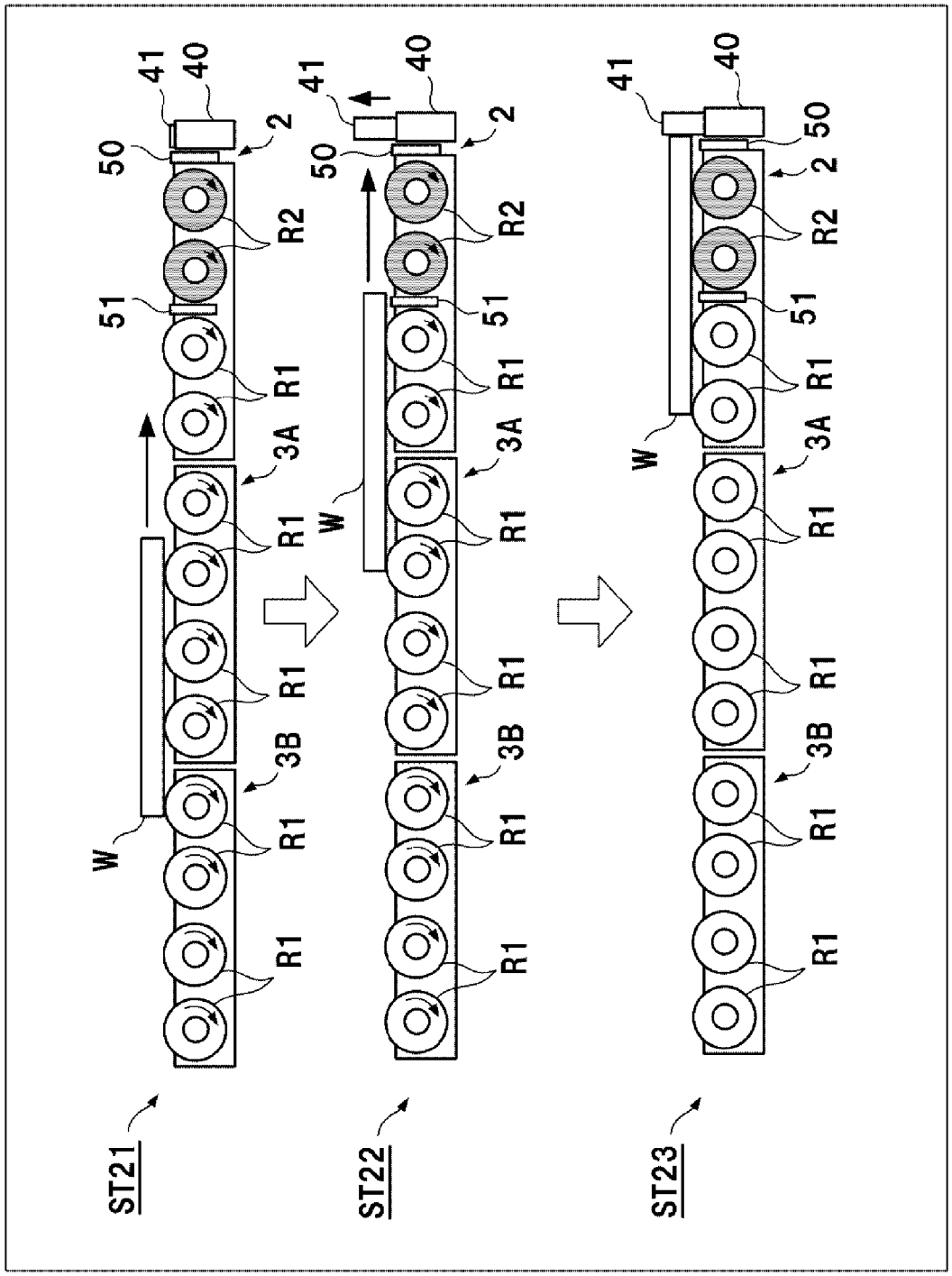
FIG. 10 is an explanatory view of the example of transport control.

An example of transport control of the work W in this embodiment will be explained next with reference to FIGS. 9 and 10. FIG. 9 is a flowchart of an example of transport control to be executed by a processing unit 101. FIG. 10 is an explanatory view of the example of transport control, in which a transport unit 3C is not illustrated.

Referring to FIG. 9, driving of driving units 22 and 32 starts in step S11. This is the same processing as that in step S1 of FIG. 4. The rotational speed of a driving roller R is always uniform in each of the transport unit 2 and transport units 3A and 3B at the time of driving. The rotational speed can be the same as that in the example shown in FIG. 5.

By rotating the driving rollers R, the work W located upstream is transported downstream, and the single transport state and the joint transport state can be generated, as in the first embodiment. State ST21 in FIG. 10 exemplifies the joint transport state in which the work W moves from the transport unit 3B to the transport unit 3A. As already described above, the rotational speed of the driving roller R1 differs between the transport units 3A and 3B, but the speed difference is absorbed. At this stage, the stop device 40 is in a non-driving state in which the movable portion 41 is located at the down position.

Referring back to FIG. 9, in step S12, the detection result of the sensor 51 is acquired to determine whether the work W has reached the stop preparation position. If the work W has reached the stop preparation position, the process advances to step S13. If the work W has not reached the stop preparation position, the processing in step S12 is repeated.

In step S13, the stop device 40 is driven to move up the movable portion 41 to the up position. State ST22 in FIG. 10 represents a state in which the work W has reached the stop preparation position, the sensor 51 has detected it, and the movable portion 41 has moved up to the up position.

Referring back to FIG. 9, in step S14, the detection result of the sensor 50 is acquired to determine whether the work W has reached the stop position SP. If the work W has reached the stop position SP, the process advances to step S15. If the work W has not reached the stop position SP, the processing in step S14 is repeated.

In step S15, the driving unit 22 is stopped. This is the same processing as that in step S3 of FIG. 4. In response to this, the rotation of the driving rollers R is also stopped. State ST23 in FIG. 10 represents a state in which the work W has reached the stop position SP and abutted against the movable portion 41 of the stop device 40, and its transport has been stopped. An effect produced by the driving roller R2 at the time of stopping the work W is the same as that in the first embodiment. The work W can be stopped more reliably in a shorter distance, and the backward movement of the work W can also be avoided.

<Third Embodiment>

Figure 11:
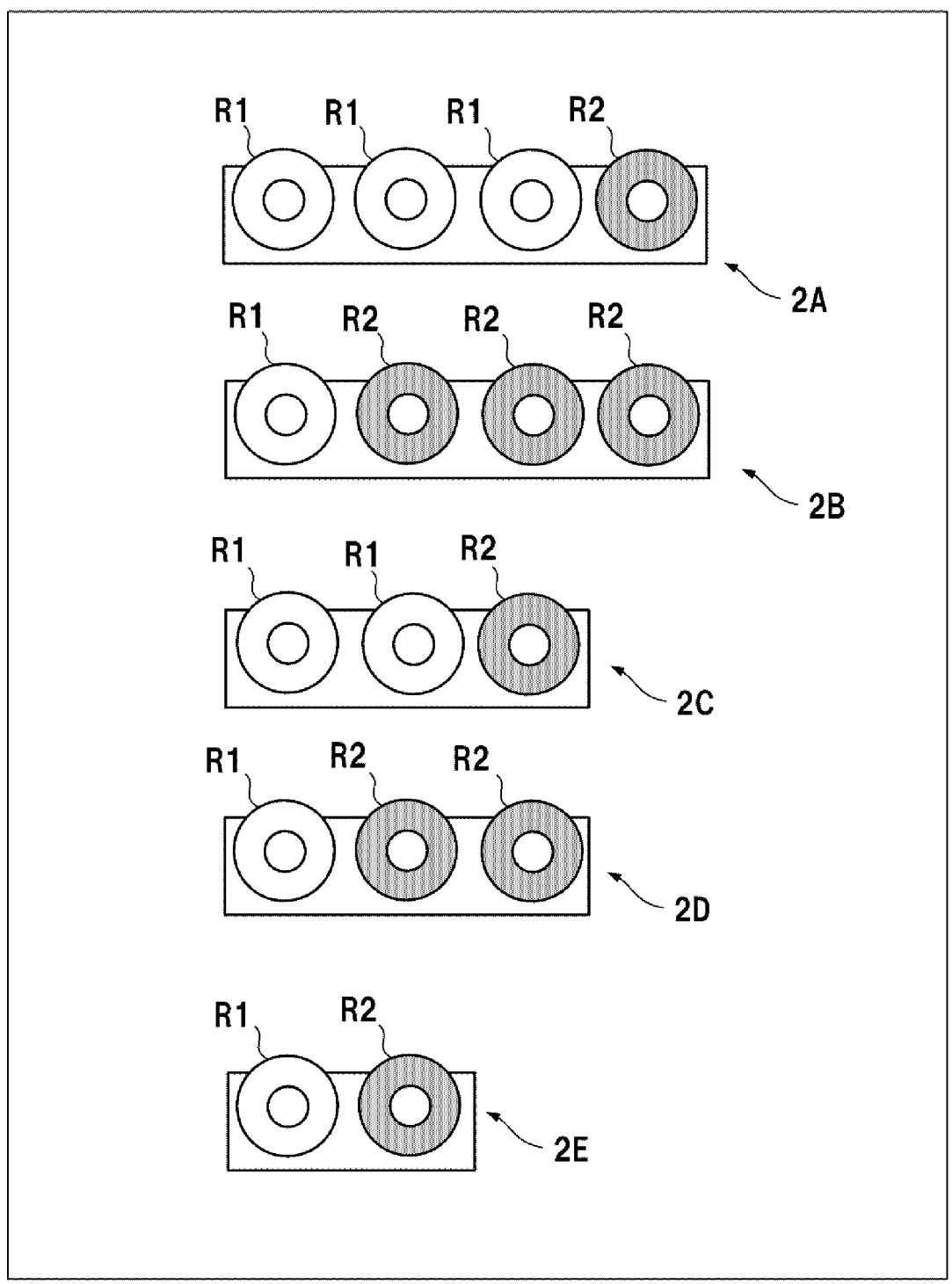
FIG. 11 is an explanatory view of another example of a transport unit.

Each of the first and second embodiments adopts the two driving rollers R1 and the two driving rollers R2 in the transport unit 2, but the present invention is not limited to this. Also, each of the first and second embodiments adopts a total of four driving rollers R in the transport unit 2, but the present invention is not limited to this. FIG. 11 shows a plurality of other examples of a transport unit 2.

A transport unit 2A includes one driving roller R2. To the contrary, a transport unit 2B includes three driving rollers R2. A transport unit 2C includes a total of three driving rollers R, one of which is a driving roller R2. A transport unit 2D includes a total of three driving rollers R, two of which are driving rollers R2. A transport unit 2E includes a total of two driving rollers R, one of which is a driving roller R2.

In this manner, the numbers of driving rollers R1 and R2 and the total number of them can be appropriately selected in accordance with the deceleration of a work W, the weight, and the like. It suffices to arrange at least one driving roller R1 on the upstream side and at least one driving roller R2 on the downstream side.

Similarly, the number of driving rollers R1 in a transport unit 3 can also be appropriately selected in accordance with the deceleration of the work W, the weight, and the like. Considering the transport stability of the work W, each of the transport units 2 and 3 preferably includes at least a total of three driving rollers R in a transport direction D of the work W.

<Fourth Embodiment>

The first to third embodiments have assumed a relatively narrow driving roller R, and the roller conveyors 20 and 30 are arranged in two lines. However, it is also possible to employ a relatively wide (long in the rotating shaft direction) driving roller R, and arrange a roller conveyor in one line.

FIG. 12 is a plan view showing another example of a transport unit 2. In this example, a transport unit 2F in FIG. 12 employs long driving rollers R1' and R2' instead of the driving rollers R1 and R2. In the arrangement of FIG. 12, a roller conveyor is arranged in one line. In this way, driving rollers R of a different type can be adopted appropriately.

<Fifth Embodiment>

The above-described embodiments have assumed that the transport unit 2 is always fixed and installed. Alternatively, a transport unit 2 may be mounted on a turntable having an elevating function, and may be moved up and down and turned. After a work W is stopped, it can be transported in another direction by the transport unit 2.

In the above-described embodiments, the processing unit 101 executes a control program as the control apparatus 100. However, the present invention is not limited to this, and a control apparatus 100 may be constituted by a plurality of circuits that share the respective processes shown in FIGS. 4 and 9.

In the above-described embodiments, the transport system 1 is constituted by a plurality of transport units 2 and 3. However, the transport system 1 need not always be constituted by respective units as long as the driving rollers R can be arranged appropriately.

The present invention is not limited to the above-described embodiments, and various changes and modifications can be made without departing from the spirit and scope of the present invention. Therefore, to apprise the public of the scope of the present invention, the following claims are made.

What is claimed is:

1. A transport system comprising:
   at least one first transport unit; and
   a second transport unit arranged downstream in a transport direction of a work successively to said first transport units,
   wherein said first transport unit is an accumulation conveyor including a plurality of driving rollers,
   said second transport unit includes:
   at least one first driving roller; and
   at least one second driving roller arranged downstream in the transport direction with respect to the first driving roller,
   the first driving roller is capable of idling on a driving shaft,
   the second driving roller is incapable of idling on a driving shaft, and
   the transport system further comprises:
   a stop device configured to abut against the work at a stop position at a downstream end of said second transport unit in the transport direction and stop movement of the work;
   a sensor configured to detect that the work has reached the stop position; and
   a control apparatus configured to control said second transport unit and said stop device,
   wherein said control apparatus includes:
   a driving control unit configured to control driving of said second transport unit, and drive the first driving roller and second driving roller of said second transport unit at a speed lower than a speed of the plurality of driving rollers of said first transport unit; and
   a driving stop control unit configured to stop driving of the first driving roller and second driving roller of said second transport unit when said sensor detects that the work has reached the stop position.

2. A transport system comprising:
   at least one first transport unit; and
   a second transport unit arranged downstream in a transport direction of a work successively to said first transport units,
   wherein said first transport unit is an accumulation conveyor including a plurality of driving rollers, said second transport unit includes:
at least one first driving roller; and
at least one second driving roller arranged downstream in the transport direction with respect to the first driving roller,
the first driving roller is capable of idling on a driving shaft,
the second driving roller is incapable of idling on a driving shaft, and
the transport system further comprises:
a stop device configured to abut against the work at a stop position at a downstream end of said second transport unit in the transport direction and stop movement of the work;
a stop position sensor configured to detect that the work has reached the stop position;
a preparation position sensor configured to detect that the work has reached a stop preparation position on an upstream side in the transport direction with respect to the stop position; and
a control apparatus configured to control said second transport unit and said stop device,
wherein said control apparatus includes:
a driving control unit configured to control driving of said second transport unit, and drive the first driving roller and second driving roller of said second transport unit at a speed lower than a speed of the plurality of driving rollers of said first transport unit;
a stop device driving unit configured to drive said stop device when said preparation position sensor detects that the work has reached the stop preparation position; and
a driving stop control unit configured to stop driving of the first driving roller and second driving roller of said second transport unit when said stop position sensor detects that the work has reached the stop position.

3. A method of controlling a transport system,
the system including:
at least one first transport unit;
a second transport unit arranged downstream in a transport direction of a work successively to the first transport units; and
a stop device,
wherein the first transport unit is an accumulation conveyor including a plurality of driving rollers,
the second transport unit includes:
at least one first driving roller; and
at least one second driving roller arranged downstream in the transport direction with respect to the first driving roller,
the first driving roller is capable of idling on a driving shaft,
the second driving roller is incapable of idling on a driving shaft, and
the stop device is configured to abut against the work at a stop position at a downstream end of the second transport unit in the transport direction and stop movement of the work
said method comprising:
a first transport step of driving the first transport unit at a uniform speed and transporting a work by the first transport unit;
a joint transport step of driving the second transport unit at a uniform speed lower than the speed of the first transport unit, and transporting the work from the first transport unit to the second transport unit;
a second transport step of driving the second transport unit at the low uniform speed subsequently to the joint transport step and transporting, by the second transport unit, the work transported to the second transport unit;
a driving stop control step of, when a sensor detects that the work has reached the stop position, stopping the first driving roller and second driving roller of the second transport unit during driving at the uniform speed; and
a stop step of transporting the work by rotation of the first driving roller and second driving roller of the second transport unit until the first driving roller and second driving roller of the second transport unit are completely stopped by the driving stop control step, causing the work to abut against the stop device, and completely stopping the work at an abutment position without generating a backward movement of the work in reaction to a shock.

4. A method of controlling a transport system,
the system including:
at least one first transport unit;
a second transport unit arranged downstream in a transport direction of a work successively to the first transport units; and
a stop device,
wherein the first transport unit is an accumulation conveyor including a plurality of driving rollers,
the second transport unit includes:
at least one first driving roller; and
at least one second driving roller arranged downstream in the transport direction with respect to the first driving roller,
the first driving roller is capable of idling on a driving shaft,
the second driving roller is incapable of idling on a driving shaft, and
the stop device is configured to abut against the work at a stop position at a downstream end of the second transport unit in the transport direction and stop movement of the work,
said method comprising:
a first transport step of driving the first transport unit at a uniform speed and transporting a work by the first transport unit;
a joint transport step of driving the second transport unit and the first transport unit at a uniform speed lower than the speed of the first transport unit, and transporting the work from the first transport unit to the second transport unit;
a second transport step of driving the second transport unit at the low uniform speed subsequently to the joint transport step and transporting, by the second transport unit, the work transported to the second transport unit;
a stop device driving step of, when a preparation position sensor detects that the work has reached a stop preparation position on an upstream side in the transport direction with respect to the stop position, stopping the stop device;
a driving stop control step of, when a stop position sensor detects that the work has reached the stop position, stopping the first driving roller and second driving roller of the second transport unit during driving at the uniform speed; and
a stop step of transporting the work by rotation of the first driving roller and second driving roller of the second transport unit until driving of the first driving roller and second driving roller of the second transport unit is completely stopped by the driving stop control step, causing the work to abut against the stop device, and completely stopping the work at an abutment position without generating a backward movement of the work in reaction to a shock.

* * * * *